United States Patent [19]
Peltonen

[11] Patent Number: 4,986,842
[45] Date of Patent: Jan. 22, 1991

[54] HEAT TRANSFER METHOD IN A GLASS SHEET BENDING FURNACE AND BENDING FURNACE

[75] Inventor: Esko J. Peltonen, Kangasala, Finland
[73] Assignee: Tamglass Oy, Tampere, Finland
[21] Appl. No.: 435,999
[22] Filed: Nov. 14, 1989
[30] Foreign Application Priority Data
Nov. 24, 1988 [FI] Finland ................................. 885450
[51] Int. Cl.⁵ ..................... C03B 23/025; C03B 27/044
[52] U.S. Cl. ......................................... 65/104; 65/107; 65/273
[58] Field of Search ................. 65/104, 107, 119, 273, 65/285

[56] References Cited
U.S. PATENT DOCUMENTS

| | | | |
|---|---|---|---|
| 3,248,517 | 4/1966 | Vranken | 65/107 |
| 3,431,095 | 3/1969 | Ross | 65/107 |
| 3,884,667 | 5/1975 | Schraven | 65/119 |
| 4,497,645 | 2/1985 | Peltonen | 65/107 |
| 4,755,204 | 7/1988 | Boardman et al. | 65/107 |

Primary Examiner—Joye L. Woodard
Attorney, Agent, or Firm—Burns, Doane, Swecker & Mathis

[57] ABSTRACT

A heat transfer method in a glass sheet bending furnace and a glass sheet bending furnace for carrying out the method are disclosed. The furnace includes a top array of successive heating sections and a bottom array of successive cooling sections, and glass sheets are placed on bending moulds supported by wagons and are advanced on conveyor tracks through the heating and cooling sections. Heat is transferred from bent, hot glass in a cooling section to unbent, cold glass in a heating section by air which is sucked from the cooling section and blasted into the heating section.

8 Claims, 3 Drawing Sheets

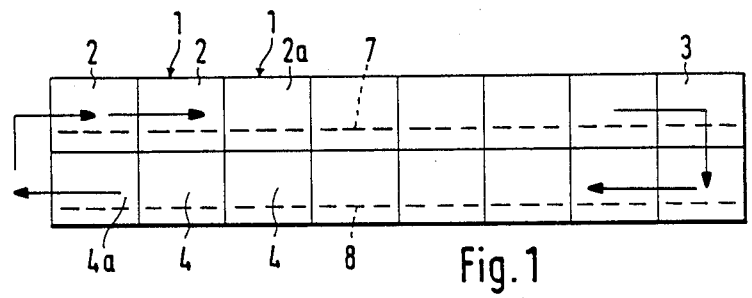
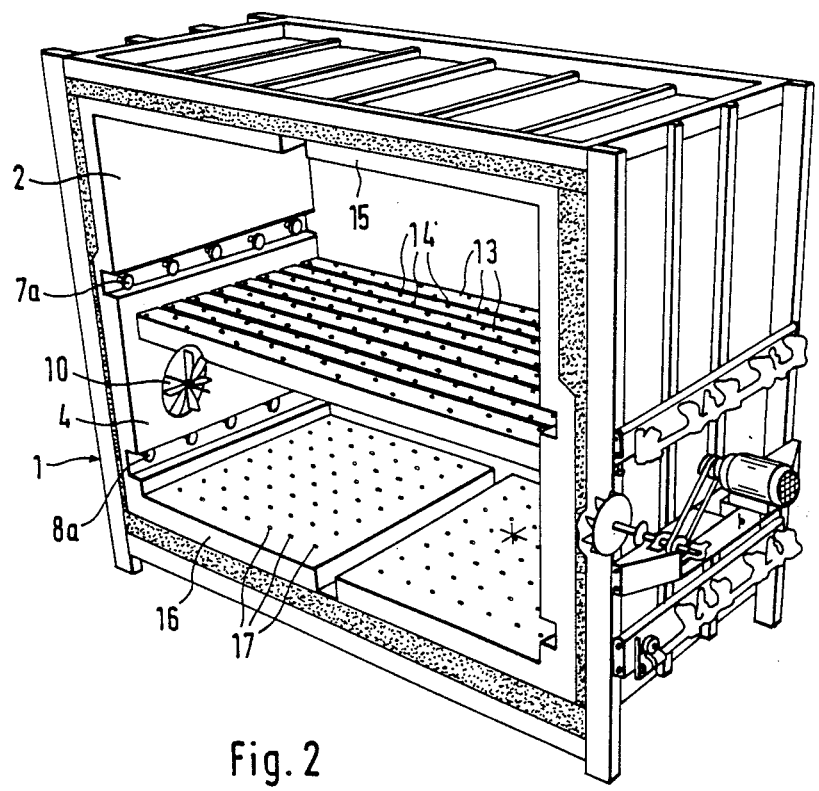
Fig. 1
Fig. 2

HEAT TRANSFER METHOD IN A GLASS SHEET BENDING FURNACE AND BENDING FURNACE

The present invention relates to a heat transfer method in a glass sheet bending furnace, comprising a top array of successive heating sections and a bottom array of successive cooling sections, whereby the glass sheets are placed upon bending moulds supported by carrier wagons and the successive wagons are advanced on the top conveyor track from one heating section to the next and, correspondingly, on the bottom conveyor track from one cooling section to the next and heat is transferred from the bent, hot glasses and moulds in cooling sections to the non-bent, colder glasses and moulds in heating sections.

The invention relates also to a glass sheet bending furnace for carrying out the method, said furnace comprising a top array of successive heating sections and a bottom array of successive cooling sections as well as, respectively, a top and a bottom conveyor track for the carrier wagons of bending moulds.

As for the prior art, reference is made to the Applicants' U.S. Pat. No. 4,497,645 which discloses the intensification of heat transfer through the wagon floors. In this prior art method, the transfer of heat is affected by means of radiation and gravitational convection.

An object of the invention is to provide an improved heat transfer method for further intensifying the transfer of heat from hot glass to colder glass as well as from a hot mould to a colder mould.

This object is achieved on the basis of the inventive features set forth in the annexed claims.

Thus, the invention can be used for accelerating the cooling rate of glass sheets to be cooled, for accelerating the heating rate of glass sheets to be heated, for more effective exploitation of the thermal energy of glass sheets to be cooled, for retrieving glass sheets from the furnace colder than heretofore and, in addition, the invention can accomplish a more uniform cooling rate and a more uniform heating rate for glass sheets.

BRIEF DESCRIPTION OF THE DRAWINGS

The invention will now be described in more detail with reference made to the accompanying drawings, in which FIG. 1 shows a bending furnace schematically in a side view.

FIG. 2 shows a cutaway perspective view of one section of a furnace, including a top heating section and a bottom cooling section.

DESCRIPTION OF THE PREFERRED EMBODIMENT

Figure 3:
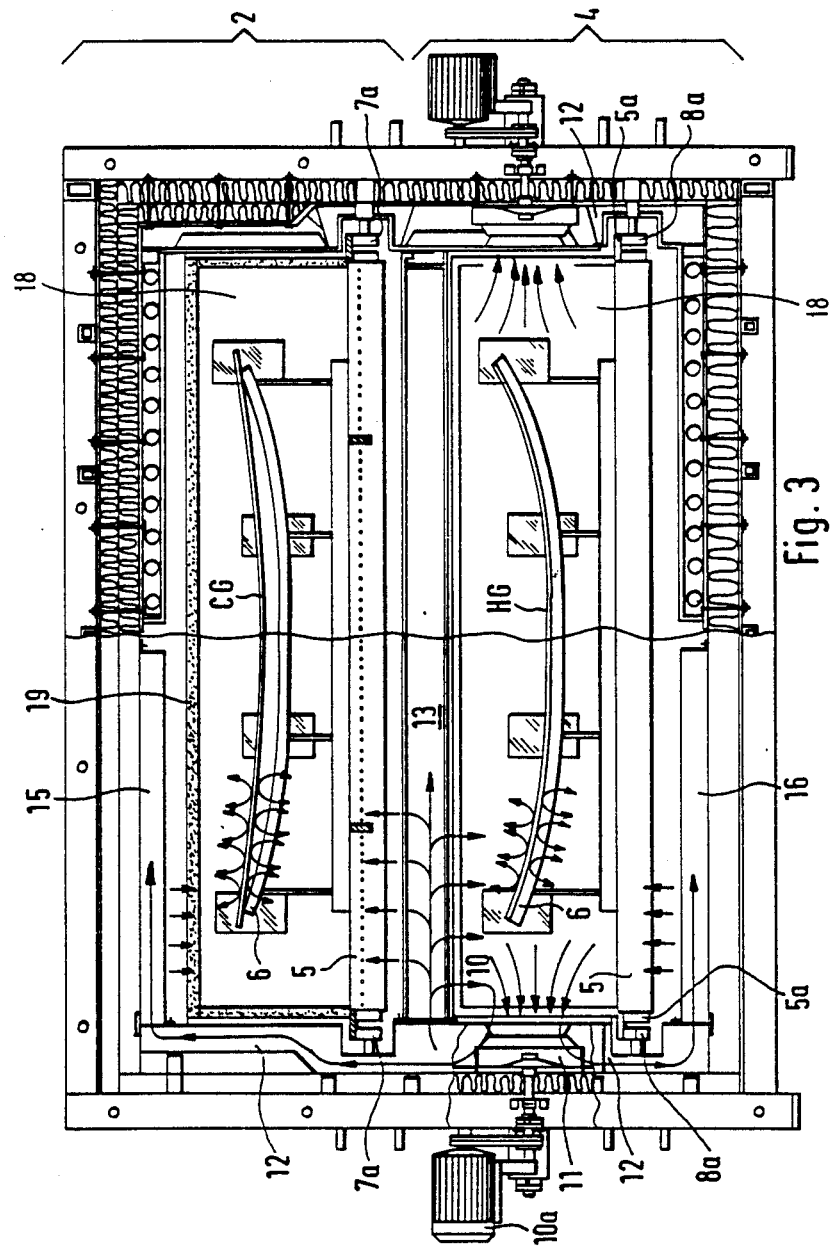
FIG. 3 shows a cross-section of a bending furnace.

The bending furnace shown in FIG. 1 includes a top or upper array of successive heating sections 2 and a bottom or lower array of successive cooling sections 4.

The arrows indicate the traveling path of glass sheets along an upper conveyor track 7 and a lower conveyor track 8. The first heating sections 2 are so-called preheating sections which are followed by actual heating sections and then by one or two bending sections 3. At least the preheating sections 2 along with cooling sections 4 therebelow consist of section units 1 as shown in FIG. 2.

The glass sheets are placed upon bending moulds 6 supported by carrier wagons 5 shown in FIG. 3. The rails 5a of wagons 5 are carried on top of upper track rollers 7a and, respectively, on top of lower track rollers 8a. The successive wagons 5 are advanced on upper conveyor track 7 from one heating section 2 to the next. Correspondingly, on lower conveyor track 8 said wagons 5 are advanced from one cooling section 4 to the next. Thus, heat is transferred from the bent, hot glasses HG in cooling sections 4 to non-bent, colder glasses CG in heating sections 2. In the solution disclosed in U.S. Pat. No. 4,497,645, the heat transferred by means of radiation and gravitational convection.

In this invention, the transfer of heat is intensified by means of the arrangement described hereinbelow.

As shown in FIGS. 2 and 3, the ceiling and floors of heating section 2 as well as those of cooling section 4 are fitted with blast air supply boxes 13, 15, 16 provided with blast orifices 14, 17 which are distributed substantially over the entire surface area of the sections. Both side walls of cooling sections 4 are fitted with fans 11 whose suction inlets 10 open into the cooling section through opposite side walls of the cooling section as seen in FIG. 3. The pressure sides of fans 11 are connected by air passages 12 to said supply boxes 13, 15, 16.

The fan 11 are used for the continuous suction of air from cooling section 4, whereby a hot glass sheet HG delivers heat into said air upon cooling. From the blast orifices 14, 17 of supply boxes 13, 15, 16 the air discharges as substantially vertical blast jets to the top and bottom surfaces of glass sheet CG as well as to the top and bottom surfaces of glass sheet HG. The air coming into section 2 finds its way back into section 4 through the gaps between box beams 13.

In order to maintain thermal equilibrieum, hot air is discharged from at least one section 2 and, respectively, at least one section 4 is supplied with cold replacement air which in the lengthwise direction of the furnace is distributed from one section 4 to another section 4. Most preferably, the cold replacement air is supplied into section 4a and some hot air is discharged from section 2a (FIG. 1).

The heat transfer arrangement of the invention is typically carried out e.g. in three heating sections (depending on furnace capacity) and respectively in as many of the last cooling sections 4.

Figure 4:
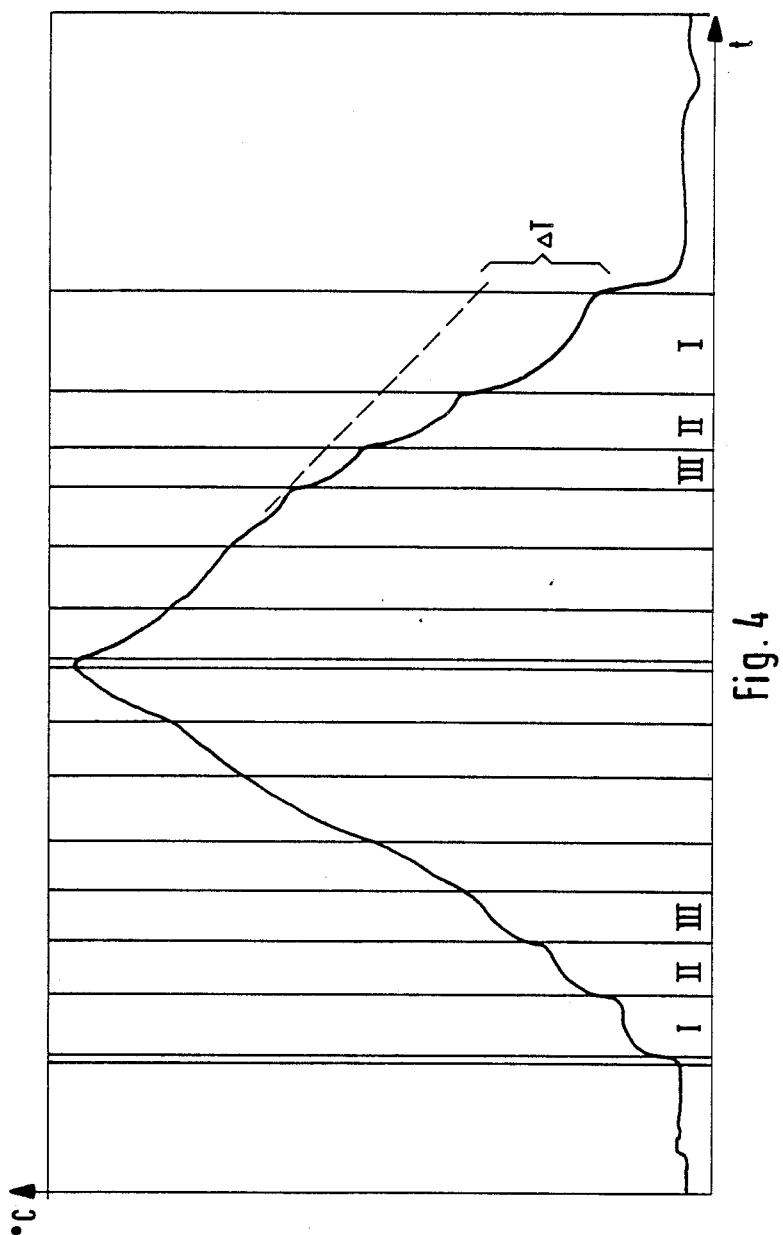
FIG. 4 is a graph showing the glass sheet temperature as a function of time, the successive sections being separated by vertical lines. The rising curve represents heating on the upper track and the falling curve represents cooling on the lower track.

The temperature curve of FIG. 4 illustrates a situation in which the intensified heat transfer has been affected in three successive sections, indicated with ordinal numbers I, II and III. The curve indicates that in sections I, II and III, i.e. on the rising section of the curve, the glass sheet temperature increasing rate is initially very high whereby the final temperature of the section is reached quickly or, alternatively, the glass sheet takes a longer time to reach the final temperature of the section. Accordingly, on the falling section of the curve, the cooling proceeds in cooling sections I, II and III in a manner that the temperature decreasing rate is very high at the beginning of each cooling cycle. By virtue of this, the glass coming out of the furnace has a temperature substantially lower than what it would have without the intensified heat transfer of the invention. The temperature difference is indicated in FIG. 4 with ΔT. The invention serves also to increase production capacity in that the furnace will be able to operate on the maximum capacity determined on the basis of time required for bending a glass sheet in bending section 3 (FIG. 1).

FIG. 3 illustrates flat rails 5a which run alongside wagons 5 and which carry wagons 5 resting upon conveyor rollers 7a. The end walls 18 of wagons 5 provide partitions between successive sections 2, 2 or 4, 4 whenever said wagons 5 are stopped inside the sections. At the junctions between successive heating sections 2 there is provided a resilient sealing means 19 which comes into contact with the edges of end walls 18 of the wagons and which is e.g. a brush made of artificial fibers and/or hair and which provides a barrier to the air flows between the successive sections. This makes it easier to maintain the temperature differences between successive heating sections 2. On the other hand, temperature differences between the superimposed sections should be equalized as effectively as possible according to the invention.

I claim:

1. A method of heat transfer in a glass sheet bending furnace which includes a top array of successive heating sections for heating glass sheets and a bottom array of successive cooling sections for cooling said glass sheets, wherein said method comprises:
    advancing at least one cold piece of glass through at least one of said heating sections on an upper conveyor track;
    advancing at least one hot piece of glass through at least one of said cooling sections on a lower conveyor track; and
    transferring heat from said at least one hot piece of glass to said at least one cold piece of glass by sucking air from said at least one cooling sections and blasting said air into both said at least one heating sections and said at least one cooling section.

2. A method as claimed in claim 1, wherein said air is blasted into said at least one heating section and said at least one cooling section onto said at least one cold piece of glass and said at least one hot piece of glass by substantially vertical blast jets located in a ceiling and a floor of said at least one heating section and a ceiling and a floor of said at least one cooling section.

3. A method as claimed in claim 1, wherein said air is sucked from at least one cooling section by fans having suction inlets which open into said at least one cooling section through opposite side walls of said at least one cooling section.

4. A glass sheet bending furnace, comprising:
    a top array of successive heating sections for heating glass sheets;
    a bottom array of successive cooling sections for cooling said glass sheets;
    an upper conveyor track running through at least one of said heating sections for conveying a carrier wagon carrying a cold piece of glass through said at least one heating section;
    a lower conveyor track running through at least one of said cooling sections for conveying a carrier wagon carrying a hot piece of glass through said at least one cooling section;
    means for sucking air from said at least one cooling section; and
    means for blasting said air into both said at least one heating section and said at least one cooling section.

5. A furnace as claimed in claim 4, wherein said means for sucking air includes a fan having a suction inlet which opens into said at least one cooling section.

6. A furnace as claimed in claim 4, wherein said means for blasting air includes blast air supply boxes on a ceiling and a floor of said at least one heating section and on a ceiling and a floor of said at least one cooling section, said blast air supply boxes including blast orifices for blasting said air.

7. A furnace as claimed in claim 4, wherein said means for sucking air includes fans having suction inlets which open into said at least one cooling section through opposite side walls of said at least one cooling section.

8. A furnace as claimed in claim 4, wherein said carrier wagons include end walls, said at least one heating section and said at least one cooling section include resilient sealing means therein, and said end walls of said carrier wagons and said resilient sealing means contact each other to reduce air flow between said at least one heating section and adjacent heating sections and between said at least one cooling section and adjacent cooling sections when said carrier wagons are stopped inside said at least one heating section and said at least one cooling section respectively.

* * * * *